No. 829,762. PATENTED AUG. 28, 1906.
W. R. BOYER & G. P. LAUBENSTEIN.
FLUID DISPENSING APPARATUS.
APPLICATION FILED SEPT. 22, 1904.
3 SHEETS—SHEET 2.
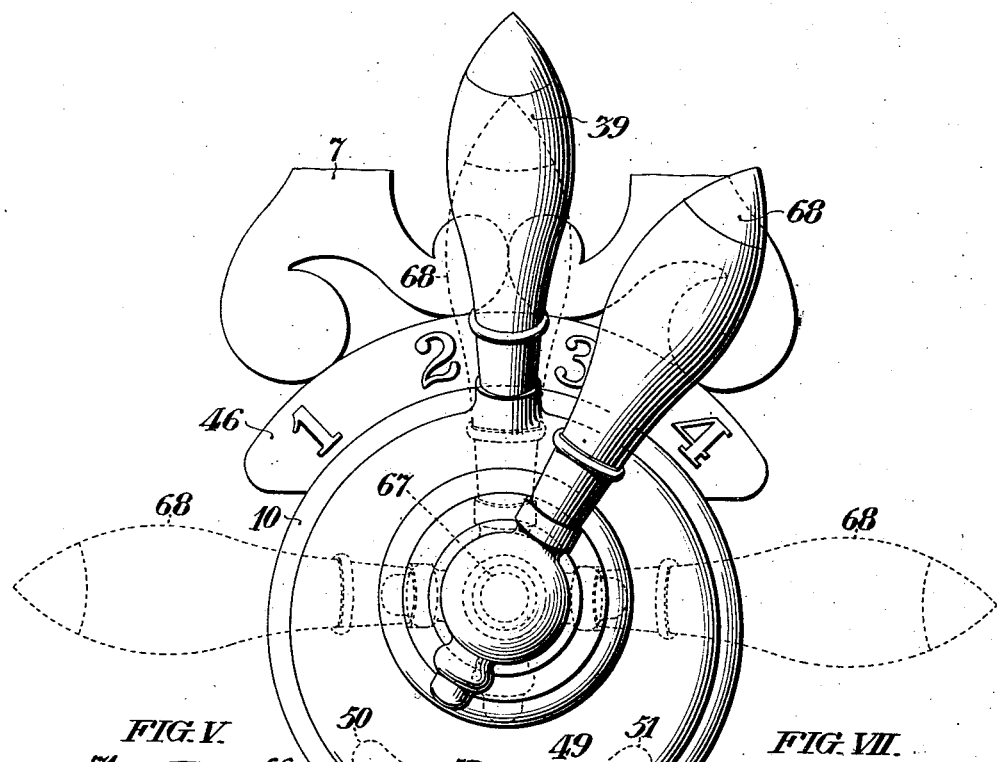
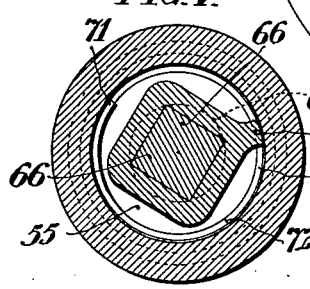
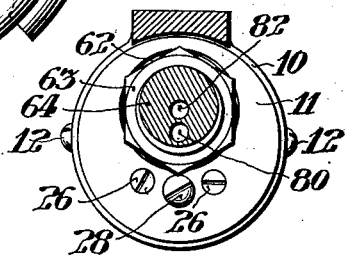
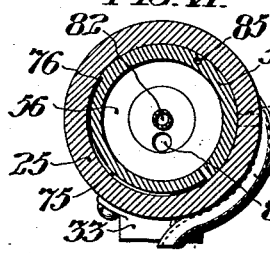
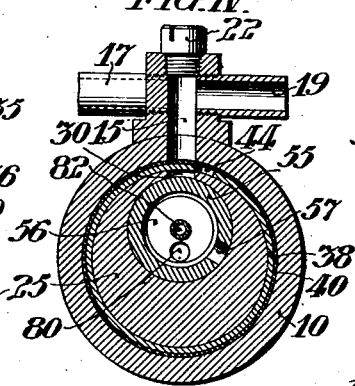
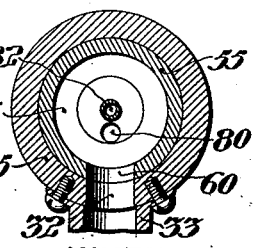
WITNESSES:
John C. Bergner
Thus. Rosenbaum
INVENTORS:
WILLIAM R. BOYER
AND
GEORGE P. LAUBENSTEIN,
by Paige, Paul & Foley
Attys.

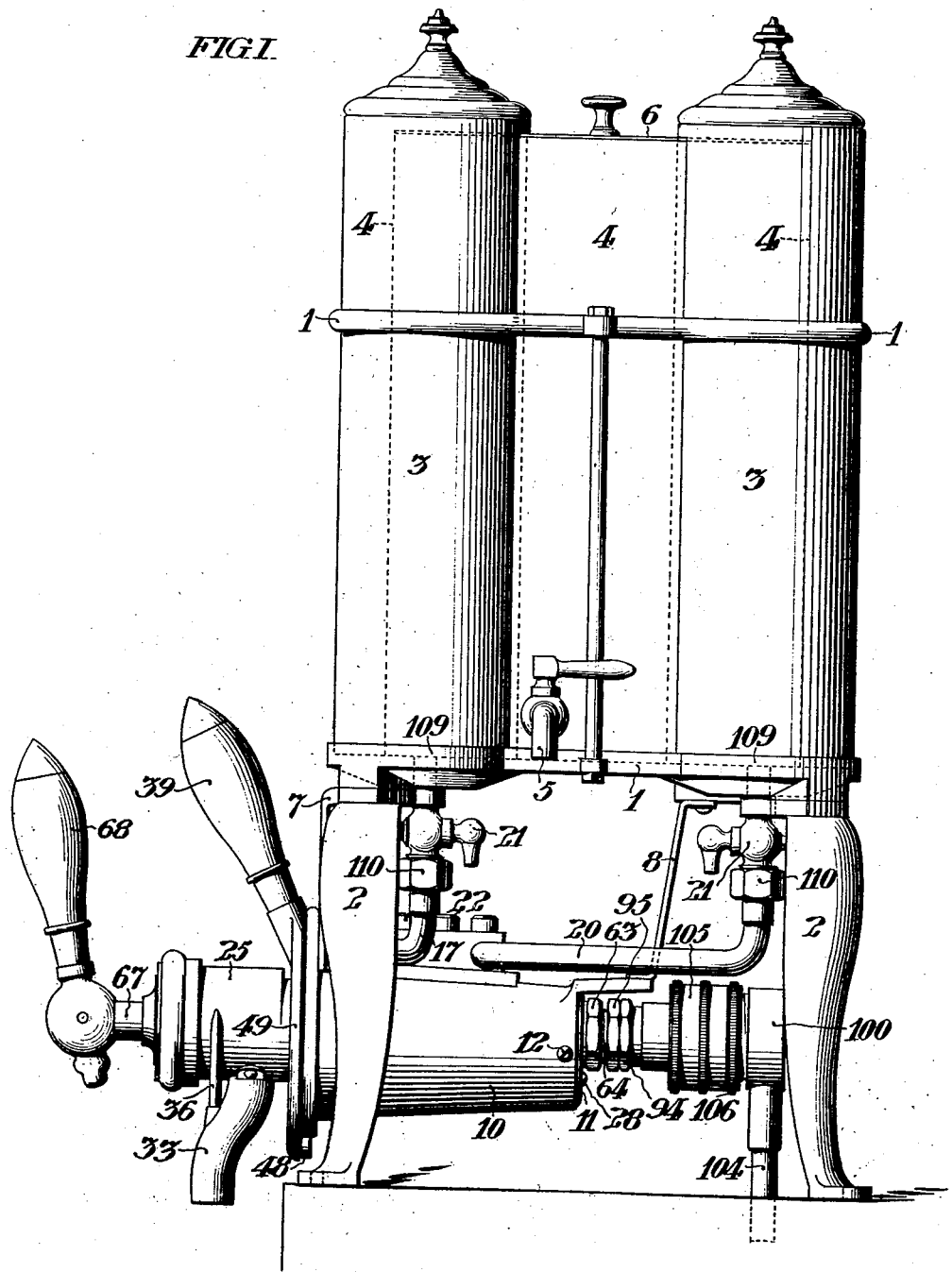

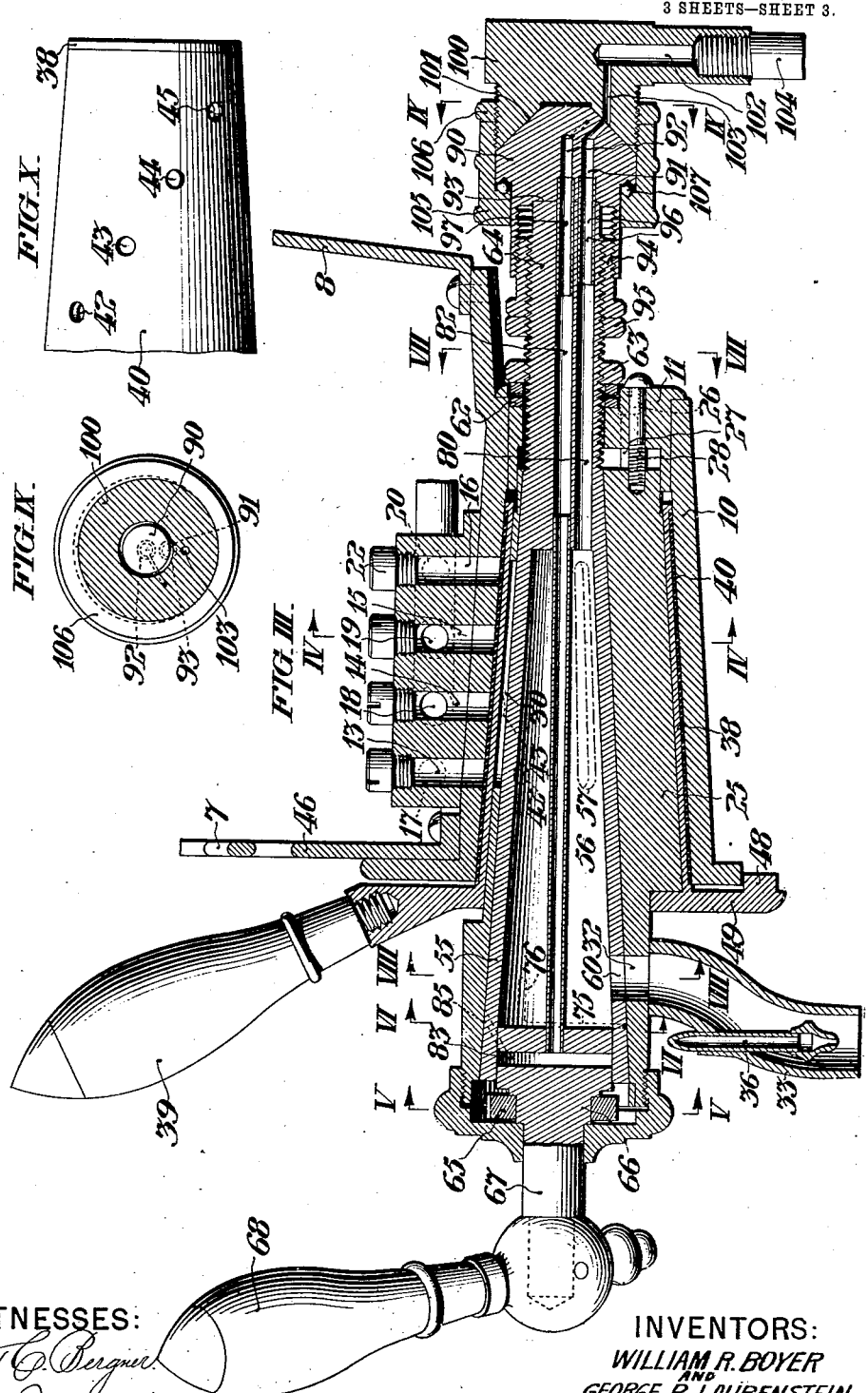

UNITED STATES PATENT OFFICE.

WILLIAM R. BOYER AND GEORGE P. LAUBENSTEIN, OF PHILADELPHIA, PENNSYLVANIA.

FLUID-DISPENSING APPARATUS.

No. 829,762.  Specification of Letters Patent.  Patented Aug. 28, 1906.

Application filed September 22, 1904. Serial No. 225,438.

*To all whom it may concern:*

Be it known that we, WILLIAM R. BOYER and GEORGE P. LAUBENSTEIN, of Philadelphia, in the State of Pennsylvania, have invented certain new and useful Improvements in Fluid-Dispensing Apparatus, whereof the following is a specification, reference being had to the accompanying drawings.

Our improvements are particularly applicable to apparatus for dispensing soda-water, wherein the same valve mechanism controls the delivery of the flavoring-syrups and the delivery of carbonated water.

Our invention provides valve mechanism which is absolutely liquid-tight, to selectively control the flow of different syrups from a plurality of receptacles, to dispense a definite amount of the selected syrup, to control the flow of the carbonated water, and to mix said water with said quantity of syrup within said valve mechanism and discharge said mixture.

As hereinafter described, our invention comprises a main valve mechanism arranged to selectively control the delivery-ports of a plurality of syrup-receptacles, combined with an auxiliary conical valve-plug and a casing comprising a conical seat for said auxiliary plug, said auxiliary-plug casing comprising a duct and said auxiliary plug comprising a plurality of ducts arranged to register with the duct in said casing, a cap arranged to adjust said auxiliary plug to its seat, and bearing-balls between said plug and cap.

Our invention comprehends the various novel features of construction and arrangement hereinafter more definitely specified.

In the accompanying drawings, Figure I is a side elevation of a soda-water apparatus conveniently embodying our improvements. Fig. II is a front elevation of the valve mechanism shown in Fig. I. Fig. III is a vertical longitudinal sectional view of said valve mechanism. Fig. IV is a vertical transverse sectional view taken on the line IV IV in Fig. III. Fig. V is a vertical transverse sectional view taken on the line V V in Fig. III. Fig. VI is a vertical transverse sectional view taken on the line VI VI in Fig. III. Fig. VII is a vertical transverse sectional view taken on the line VII VII in Fig. III. Fig. VIII is a vertical transverse sectional view taken on the line VIII VIII in Fig. III. Fig. IX is a vertical transverse sectional view taken on the line IX IX in Fig. III. Fig. X is a fragmentary plan view of the sleeve for controlling the delivery of the selected syrup.

In said figures the frame 1, having the legs 2, conveniently supports a plurality of removable syrup-receptacles 3 and a removable ice-container 4, which latter is provided with the water-outlet spigot 5 and removable lid 6.

The valve mechanism is conveniently suspended beneath said frame 1 by the hangers 7 and 8 and comprises the main casing 10, having the rear end cap 11 secured therein by set-screws 12 on opposite sides of the casing, and the plurality of syrup-ports 13, 14, 15, and 16, respectively connected to separate syrup-receptacles 3 by the pipes 17, 18, 19, and 20, each having a stop-cock 21. Each of the ports 13, 14, 15, and 16 in said casing 10 is provided with a screw-cap 22, the removal of which permits said ports to be readily cleaned. The plug 25 is mounted in said casing 10 and secured in non-rotatable but longitudinally-adjustable relation therewith by the set-screws 26 in said cap 11, thrusting against its projecting pins 27 and the screw 28, arranged to draw said plug 25 rearwardly and maintain said pins 27 in contact with said screws 26. There are two of said pins 27, one of which is shown in Fig. III, and both pins are carried by the plug 25 and extend in sockets in the cap 11 in registry with respective screws 26. (Shown in Fig. VII.) Said stationary plug 25 is provided with the aperture 30 in registry with all of the ports 13, 14, 15, and 16 and has the outlet-aperture 32 arranged to open into the mixture-discharge nozzle 33 and the jet-outlet 35, (indicated in Fig. VI,) arranged to open into the jet-nozzle 36, which latter extends into and discharges within said discharge-nozzle 33, as shown in Fig. III.

The sleeve 38, having the operating-handle 39, is interposed in rotary relation between the stationary plug 25 and its casing 10 and is provided with a plurality of apertures 42, 43, 44, and 45, arranged in diagonal relation on its circumference to register with the respective ports 13, 14, 15, and 16. Said sleeve 38 may be turned to bring any one of said apertures into registry with its respective port in said casing 10 by tilting said handle 39 into opposition to the numeral indicated on the dial-plate 46 in Fig. II, corresponding to the port for the desired syrup. Said sleeve 38 is preferably provided with a covering 40, of any suitable material, such as hard rubber, to prevent the corrosive action usual in syrup-controlling valves. The extreme positions of said sleeve 38 (designated by the numerals 1 and 4 on said plate 46 and respectively corresponding with the operative position of the apertures 42 and 45 in the sleeve 38) are determined by the lug 48, projecting from the end plate 49 on said sleeve 38 and arranged to encounter the ends 50 and 51 of the recess 52 in the casing 10. (Best shown in Fig. II.) The main rotary plug 55 is mounted in eccentric relation within said stationary plug 25 and comprises the measuring and mixing chamber 56, having the inlet-aperture 57, arranged to register with the aperture 30 in said stationary plug 25, and the ports 13, 14, 15, and 16 in said casing 10 and the outlet-aperture 60, arranged to register with the outlet-aperture 32, leading to the discharge-nozzle 33. Said rotary plug 55 is maintained in its seat in said stationary plug 25 by the spring-washer 62, held under compression by the nut 63 on the threaded stem 64 of said rotary plug, and it is limited in its rotary movement by the collar 65, fitted to the squared portion 66 of the stem 67, which carries the handle 68 of said plug 55, said collar 65 being provided with the lug 70, arranged to engage the shoulders 71 and 72 on the end of the stationary plug 25. Said rotary plug 55 is provided with the air-outlet passage or vent 75, leading from said mixing-chamber 56, extending circumferentially on the periphery of said rotary plug 55 and having the extension 76 parallel with its axis arranged to register with the outlet 32 in said stationary plug 25. Said rotary plug 55 is also provided with the carbonated-water-mixing duct 80, leading through its threaded stem 64 into the mixing-chamber 56, and the carbonated-water-jet duct 82, leading through said threaded stem 64 and chamber 56 to the carbonated-water chamber 83, which latter has the outlet-jet duct 85 extending through the wall of said rotary plug 55 and arranged to register with the aforesaid jet-outlet 35 in the stationary plug 25.

The auxiliary conical valve-plug 90, having the ducts 91 and 92, is adjustably secured to the threaded stem 64 of said main rotary plug 55 by the adjustable nut 94 and the jam-nut 95, arranged to engage the end of said threaded stem 64 within the socket 93 in said auxiliary plug 90.

In order to insure that the ports 91 and 92 shall register in liquid-tight communication with said ducts 80 and 82, the former are provided with the nipples 96 and 97, arranged to be telescoped within the latter.

The auxiliary casing 100, having the conical seat 101 for said auxiliary plug 90, is provided with the duct 102 and port 103, arranged to register with either of said ports 91 and 92 to deliver carbonated water from any desired source of supply connected with said casing by the conduit 104. Said valve-plug 90 and casing 100 are adjusted in proper relation by the cap 105, which is in screw-threaded engagement with said casing 100 and secured by the jam-nut 106, and we find it desirable to provide the bearing-balls 107 between the plug 90 and the cap 105 to permit free rotary movement of said plug 90 when its conical surface is in liquid-tight contact with its conical seat 101.

Said apparatus may be operated as follows: Both handles 39 and 68 being normally in vertical position, when it is desired to dispense soda-water of a selected flavor—for instance, the flavor contained in the receptacle which communicates with the port 15—the handle 39 is turned to the left with reference to Fig. II until it registers with the numeral "2" on the plate 46, and the aperture 44 in the sleeve 38 will then register with said port 15. The handle 68 is then turned to the left with reference to Fig. II to the horizontal position indicated by dotted lines in Fig. II, so that the aperture 57 in the plug 55 registers with said port 15, and the air-vent 75 is in communication with the outlet-aperture 32 to permit the escape of air from the chamber 56 while the latter is being filled with the selected syrup, although the outlet-aperture 60 is out of registry with said aperture 32. When the desired amount of syrup has been admitted to said chamber 56, the handle 39 is turned to its normal vertical position and the handle 68 is turned to the position shown in full lines in Figs. II and III to establish communication between the carbonated-water port 103 in the auxiliary casing 100 and the mixing-chamber 56, so that the carbonated water flushes said chamber under pressure and mixes with the syrup, the mixture being thus discharged through the apertures 60 and 32, which are then in registry. The carbonated-water-jet nozzle 36 is then brought into communication with the carbonated-water-inlet port 103 in the casing 100 by turning the handle 68 to the horizontal position indicated in dotted lines at the right-hand side of Fig. II until the desired amount of carbonated water has been delivered. The handle 68 is then turned to its normal vertical position. (Shown in dotted lines in Fig. II.) Each receptacle 3, being removably seated in its socket 109 in the frame 1 and provided below its stop-cock 21 with a union-coupling 110, may be separately removed to be cleaned. For instance, the stop-cock 21 of the receptacle 3 (shown at the right-hand side of Fig. I) may be closed and its union 110 be unscrewed to disconnect it from its outlet-pipe 20, so that the receptacle may be lifted from its socket 109 without disturbing the remainder of the apparatus and without loss of any syrup which may be contained in said receptacle.

We do not desire to limit ourselves to the precise details of construction and arrangement herein set forth, as it is obvious that various modifications may be made therein without departing from the essential features of our invention.

We claim—

1. In a fluid-dispensing apparatus, the combination with a main valve-plug comprising a duct and arranged to control the flow of fluid from a plurality of receptacles; of a casing for said plug; an auxiliary valve-plug comprising a duct; a tube in said auxiliary valve-plug, in telescopic relation with the duct in the main valve-plug; and, a casing for said auxiliary plug, comprising a duct arranged to register with the duct in said auxiliary plug, substantially as set forth.

2. In a fluid-dispensing apparatus, the combination with a main valve-plug inclosing a chamber, and having a duct leading to said chamber and an inlet and outlet, and arranged to control the flow of fluid from a plurality of receptacles; of a casing for said plug; an auxiliary plug comprising a duct, adjustably connected to said main plug and arranged to turn therewith and control the flow of fluid from an auxiliary receptacle; and, a tube in communication with the duct in said auxiliary plug, carried by the latter and arranged to be telescoped within the duct in said main plug, substantially as set forth.

3. In a fluid-dispensing apparatus, the combination with a casing comprising a conical valve-seat and a duct leading through said seat; of a conical plug comprising a duct arranged to register with the duct in said casing; a cap in screw-threaded engagement with said casing; means arranged to prevent rotation of said cap on said casing; bearing-balls between said cap and said plug; a separable screw-threaded stem having a duct leading therethrough in registry with the duct in said plug; an adjustable nut oppositely screw-threaded in engagement with said plug and said stem; and, means arranged to secure said nut on said stem in adjusted position, substantially as set forth.

4. In a fluid-dispensing apparatus, the combination with a casing comprising a plurality of ports; of a cap for said casing comprising apertures; a stationary plug comprising an inlet and an outlet, said inlet being in registry with said ports; pins projecting from said stationary plug and extending into said apertures; set-screws in said apertures arranged to thrust against the ends of said pins and thereby adjust said stationary plug; a set-screw extending through said cap in screw-threaded engagement with said stationary plug, arranged to secure said plug in adjusted position; a rotary sleeve provided with a covering of non-corrosive material, interposed between said stationary plug and said casing and having a plurality of apertures arranged in diagonal relation, to register respectively with the ports in said casing; and, a rotary valve-plug in said stationary plug, comprising an inlet and an outlet arranged to register respectively with the inlet and outlet in said stationary plug, substantially as set forth.

5. In a fluid-dispensing apparatus, the combination with a plurality of syrup-receptacles; of a main valve-casing comprising ports; removable cleaning-caps for said ports; ducts respectively connecting said receptacles with individual ports; cocks arranged to independently control said ducts; a stationary valve-plug in said casing provided with shoulders and comprising an inlet-aperture in registry with said ports and a discharge-outlet having a discharge-nozzle; a jet-outlet extending into said discharge-nozzle and having a jet-nozzle; means arranged to axially adjust said stationary plug in said casing; a main rotary valve-plug extending through said stationary plug, in eccentric relation therewith, inclosing a chamber having an inlet-aperture arranged to register with the ports in said casing, an outlet-aperture arranged to register with the discharge-outlet in said stationary plug, and an air-outlet extending through the wall of said main rotary plug in communication with its chamber and a passage extending partially around the periphery of said main plug, and having an extension parallel with the plug-axis, arranged to register with said discharge-outlet in the stationary plug; an outlet-jet duct extending through the wall of said rotary plug, arranged to register with the jet-outlet in said stationary plug; a lug carried by said main plug, arranged to limit its movement by encountering said shoulders in the stationary plug; means arranged to axially adjust said main plug; a rotary sleeve surrounding said stationary plug, comprising a plurality of apertures diagonally disposed on its periphery, arranged to register with respective ports in said casing; means arranged to limit the movement of said sleeve; an auxiliary valve-casing comprising a conical seat and a duct opening therethrough; an auxiliary conical valve-plug, adjustably secured to said main valve-plug, in concentric relation therewith, arranged for rotary movement on the seat in said auxiliary casing, and comprising a duct in communication with the chamber in said main plug arranged to register with said duct in the auxiliary casing; a jet-outlet in communication with the jet-duct in said main plug and arranged to register with said duct in the auxiliary casing; a cap for said auxiliary casing arranged to adjust said auxiliary plug to its seat; and, bearing-balls between said cap and said auxiliary plug, substantially as set forth.

In testimony whereof we have hereunto signed our names, at Philadelphia, in the State of Pennsylvania, this 20th day of September, 1904.

WILLIAM R. BOYER.
GEORGE P. LAUBENSTEIN.

Witnesses:
ARTHUR E. PAIGE,
HENRY G. K. BOYER.